(12) United States Patent
Kögel et al.

(10) Patent No.: US 7,233,085 B2
(45) Date of Patent: Jun. 19, 2007

(54) PROTECTION CIRCUIT FOR A POWER SUPPLY UNIT, AND POWER SUPPLY UNIT WITH A RESPECTIVE PROTECTION CIRCUIT

(75) Inventors: Reinhard Kögel, Brigachtal (DE); Jean-Paul Louvel, Brigachtal (DE)

(73) Assignee: Thomson Licensing, Boulogne, Billancourt (FR)

( * ) Notice: Subject to any disclaimer, the term of this patent is extended or adjusted under 35 U.S.C. 154(b) by 0 days.

(21) Appl. No.: 10/568,175

(22) PCT Filed: Jul. 31, 2004

(86) PCT No.: PCT/EP2004/008618

§ 371 (c)(1),
(2), (4) Date: Feb. 10, 2006

(87) PCT Pub. No.: WO2005/020418

PCT Pub. Date: Mar. 3, 2005

(65) Prior Publication Data

US 2006/0221526 A1 Oct. 5, 2006

(30) Foreign Application Priority Data

Aug. 20, 2003 (DE) ................................ 103 38 189

(51) Int. Cl.
*H01H 35/00* (2006.01)
*H01H 47/00* (2006.01)
*H01H 83/18* (2006.01)
*H02B 1/24* (2006.01)
*H02H 3/02* (2006.01)
*H02H 3/42* (2006.01)

(52) U.S. Cl. ........................................ 307/126; 361/90

(58) Field of Classification Search ................ 307/126, 307/18, 29; 361/90

See application file for complete search history.

(56) References Cited

U.S. PATENT DOCUMENTS 4,937,728 A * 6/1990 Leonardi ...................... 362/97

FOREIGN PATENT DOCUMENTS

| EP | 1058374 | 12/2000 |
| EP | 1113557 | 7/2001 |
| EP | 1331722 | 7/2003 |
| JP | 9-023644 | 1/1997 |

OTHER PUBLICATIONS

Patent Abstracts of Japan, vol. 1997, No. 05, May 30, 1997 & JP 9-023644, See Ref. AD.
Search Report Dated Dec. 14, 2004.

* cited by examiner

*Primary Examiner*—Stephen W. Jackson
*Assistant Examiner*—Carlos Amaya
(74) *Attorney, Agent, or Firm*—Joseph J. Laks; Robert D. Shedd; William A. Lagoni

(57) ABSTRACT

The protection circuit serves for the monitoring of output voltages of a power supply unit which has a normal mode and a standby mode. The protection circuit comprises a first switching stage (T1), coupled to the current input (1) of which are output voltages (U5–U8) which are present both in the normal mode and in the standby mode and coupled to the control input of which are output voltages (U1–U3) which are only present in the normal mode. A control signal (Us), by which the power supply unit is switched over between normal mode and standby mode, is coupled to the control input (2) of this switching stage (T1). As a result, by means of the control signal, the output voltages which are only present in the normal mode are blocked in the standby mode by the control signal, so that in the standby mode only the output voltages (U5–U8) which are coupled to the current input (1) are monitored.

9 Claims, 1 Drawing Sheet

PROTECTION CIRCUIT FOR A POWER SUPPLY UNIT, AND POWER SUPPLY UNIT WITH A RESPECTIVE PROTECTION CIRCUIT

This application claims the benefit, under 35 U.S.C. § 365 of International Application PCT/EP04/008618, filed Jul. 31, 2004, which was published in accordance with PCT Article 21(2) on Mar. 3, 2005 in English and which claims the benefit of German patent application No. 10338189.9, filed Aug. 20, 2003.

FIELD OF THE INVENTION

The invention is based on a protection circuit comprising a first switching stage for monitoring output voltages of a power supply unit having a normal mode and a standby mode and on a power supply unit with a respective protection circuit. Protection circuits of this type are used in particular in switched-mode power supply units, in order to switch them off in time in the event of overloading, such as for example in the event of a short-circuit, so that no components of the switched-mode power supply unit are destroyed.

BACKGROUND OF THE INVENTION

DE-A-197 35 208 discloses a switched-mode power supply unit which has on the primary side switching means which bring about safe switching off of the switching transistor in the event of a secondary short-circuit. The occurrence of a short-circuit is in this case detected at a primary winding of a transformer.

U.S. Pat. No. 6,567,252 discloses a protection circuit which is arranged on the secondary side and in which a number of output voltages to be monitored of a switched-mode power supply unit are connected to a switching stage via a diode and resistor network. The switching stage is connected to a control loop of the switched-mode power supply unit and switches off the switched-mode power supply unit if a short-circuit occurs.

Protection circuits of this type, which monitor a number of output voltages, are used in particular in switched-mode power supply units based on the isolating transformer principle. These produce a large number of stabilized output voltages for circuits that are used for example in television sets, video recorders and satellite receivers. Devices of this type usually have a normal mode, in which all circuits are activated, and a so-called standby mode, in which the least possible power is used and in which usually only circuits that are required to switch the device over to the normal mode by means of a remote control are active. The power supply units used in these devices therefore have output voltages which are only present in the normal mode and output voltages which are present both in the normal mode and in the standby mode.

BRIEF SUMMARY OF THE INVENTION

The object of the present invention is to provide a protection circuit and a power supply unit with a respective protection circuit comprising a monitoring of output voltages which are only present in the normal mode of the switched-mode power supply unit and of output voltages which are produced both in the normal mode and in a standby mode.

The protection circuit according to the invention has a switching stage with a current input and with a control input and serves for the monitoring of output voltages of a power supply unit which has a normal mode and a standby mode. Coupled to the current input of the switching stage are output voltages which are present both in the normal mode and in the standby mode, and coupled to the control input are output voltages which are only present in the normal mode. As a result, by means of a control signal applied to the control input of the switching stage, the output voltages which are only present in the normal mode are blocked in the standby mode by the control signal, so that in the standby mode only the output voltages coupled to the current input are monitored.

In a preferred exemplary embodiment, the control signal which is coupled to the control input of the switching stage is the signal by which the power supply unit is switched over between normal mode and standby mode. The control signal is coupled to the control input in particular via a diode and keeps the switching stage blocked in the standby mode. The switching stage is, for example, a pnp transistor, which is kept closed by a positive control signal. One of the output voltages coupled to the current input here provides at the same time the supply voltage for the switching stage. Also connected to the current input is a second switching stage, which monitors the voltage at the current input and which switches off the power supply unit if there is a drop in this voltage.

The power supply unit is, in particular, a switched-mode power supply unit based on the isolating transformer principle, which contains a control loop for controlling a secondary output voltage. The protection circuit is coupled here to the control loop and, in the case of a short-circuit or in the event of overloading of an output voltage, passes on corresponding information via the second switching stage to the control loop, so that the switched-mode power supply unit switches off.

BRIEF DESCRIPTION OF THE DRAWINGS

The invention is explained in more detail below by way of example on the basis of schematic drawings, in the figures of which.

DETAILED DESCRIPTION OF PREFERRED EMBODIMENTS

Figure 1:
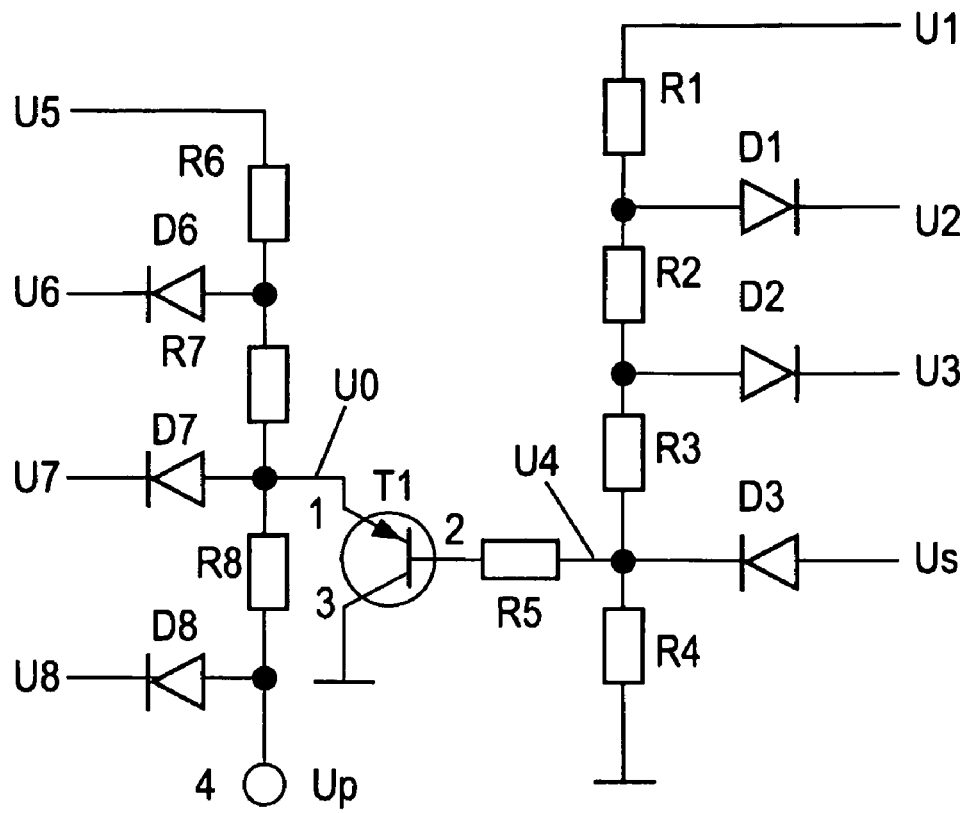
FIG. 1 shows a protection circuit for the monitoring of output voltages which are only present in the normal mode, and of output voltages which are also present in the standby mode.

Represented in FIG. 1 is a protection circuit with a first switching stage T1 for the monitoring of output voltages, which has a current input 1 and a control input 2, and which is connected by its current output 3 to a reference potential, in this exemplary embodiment to ground. The protection circuit serves for the monitoring of output voltages U1–U3 and U5–U8 of a power supply unit, not represented, which has a normal mode and a standby mode, and which provides output voltages both for the normal mode and for the standby mode.

Coupled to the current input 1 of the switching stage T1, via a chain of resistors with resistors R6–R8, are output voltages U5–U8, which are present both in the normal mode and in the standby mode. The output voltage U5 here supplies at the same time a first operating voltage U0 for the switching stage T1. The further output voltages U6–U8 are respectively decoupled from one another and from the current input 1 via diodes D6–D8, in order not to influence one another.

The output voltage U5 has here the highest voltage value and the output voltage U8 the lowest voltage value. In a practical exemplary embodiment, U5 is 5 volts and U8 is 1.8 volts. The terminal 1 of the switching stage T1 is arranged here in such a way on the chain of resistors R6–R8 that an adequate first operating voltage U0 is available for this switching stage. In order to monitor a further output voltage, it is sufficient to insert a further diode and a further resistor in the chain of voltage dividers.

The output voltages U1–U3 are connected to a control input 2 of the switching stage T1. The voltages U2 and U3 are connected in a way corresponding to the voltages U6 and U7 via diodes D1 and D2 to a chain of resistors R1–R3. The output voltage U1 is connected here without a diode to the chain of voltage dividers R1–R3 and hereby supplies a second operating voltage U4, which can be set by a resistor R4 and is connected to the control input 2 via a resistor R5.

In this exemplary embodiment, the output voltages U1–U3 and U5–U8 are all positive and the diodes D1, D2, D6–D8 are respectively polarized in the reverse direction, so that, when there is a drop in one of these output voltages, a current flows through the corresponding chain of voltage dividers or through the assigned diode. Furthermore, via a diode D3, a control signal Us is connected to a node between the resistors R4 and R5.

In this exemplary embodiment, the switching stage T1 is a pnp transistor, so that the switching stage T1 is blocked by a positive control signal Us, which is greater than or equal to the operating voltage U0, and is connected through by a control signal Us which is significantly less than the voltage U0.

The control signal Us is, in particular, a voltage by which the power supply unit of which the output voltages are being monitored is switched over between normal mode and standby mode. This voltage often has a "high" signal level for the standby mode and a "low" signal level for the normal mode. If the signal level is "low", the second operating voltage U4 is predetermined by the output voltage U1. If, therefore, one of the output voltages U1–U3 drops, for example in the case of a short-circuit or an overloading of these output voltages, the second operating voltage U4 drops and the transistor T1 switches through. As a result, the first operating voltage U0 likewise drops.

If, however, the signal level of the control signal Us is "high", as a result the transistor T1 is always kept turned off, even if the output voltages U1–U3 drop in the standby mode. This has the effect that the protection circuit does not respond to a drop in the output voltages U1–U3 in the standby mode.

If the control signal Us has an inverted logic for switching over between standby mode and normal mode, an inverter can be connected between Us and the diode D3, so that an inverted control signal Us can also be used for the protection circuit.

Also connected to the chain of resistors R6–R8 is a terminal 4, in this exemplary embodiment at a node between resistor R8 and diode D8, to which the output voltage U8 with the lowest voltage value is connected via the diode D8.

The voltage Up present at the terminal 4 is therefore dependent on the operating voltage U0, so that the operating state of the protection circuit can be detected at the terminal 4. If one of the output voltages U5–U8 drops during operation, for example in the case of a short-circuit or in the event of overloading of one of the output voltages, the voltage Up at the terminal 4 likewise drops as a result.

The diode D3 is polarized here in such a way that the voltage Up present at the terminal 4 is independent of the control signal Us. The voltage Up therefore only drops if one of the output voltages U1–U3 or U5–U8 drops in the normal mode, or one of the output voltages U5–U8 drops in the standby mode.

A second switching stage, which monitors the voltage Up, is connected to the terminal 4. The second switching stage has the function of a comparator and compares this voltage with a reference voltage. If the voltage Up drops below a specific threshold value, the second switching stage emits a control signal to the power supply unit for signalling a malfunction, so that the power supply unit switches off.

The power supply unit is, for example, a switched-mode power supply unit based on the isolating transformer principle, as are frequently used in television sets, video recorders and other devices of entertainment electronics. These usually have a control loop for controlling a secondary output voltage. The protection circuit is here likewise arranged on the secondary side and the second switching stage is advantageously connected to the control loop of the switched-mode power supply unit. As a result, the voltage value of the control loop can be set by the second switching stage to a value by which the switched-mode power supply unit switches off.

Figure 2:
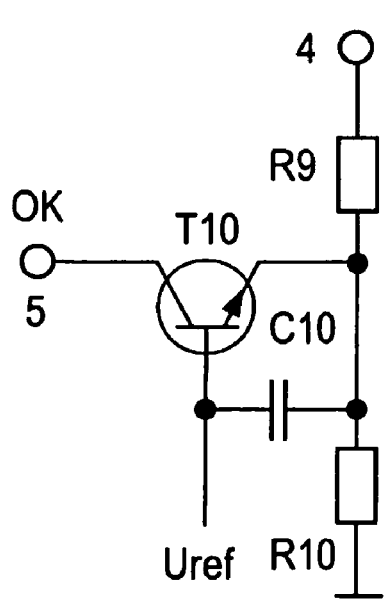
FIG. 2 shows a second switching stage, which in the case of overloading of an output voltage supplies a "low" signal.
Figure 3:
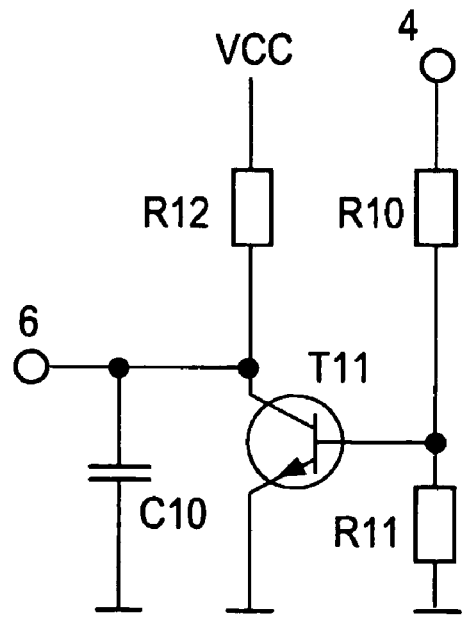
FIG. 3 shows a second switching stage, which in the case of overloading of an output voltage supplies a "high" signal.

Exemplary embodiments of a second switching stage, connected to the terminal 4, are represented in FIGS. 2 and 3. The second switching stage of FIG. 2 has a transistor T10, the base of which is connected to a reference voltage Uref and the emitter of which is connected to a voltage divider with resistors R9, R10. The resistor R9 is connected to the terminal 4, FIG. 1. The collector of the transistor T10 is connected via a terminal 5 to the optocoupler of the switched-mode power supply unit, which transmits the control signal from the secondary side to the primary side.

The function of this circuit is as follows: if the voltage Up at the terminal 4 drops below a specific threshold value, dependent on the reference voltage Uref, the transistor T10 switches through and, as a result, pulls down the voltage that is present at the optocoupler, via the terminal 5. The driver stage arranged on the primary side of the switched-mode power supply unit then interprets this voltage drop as a signal for switching off the switched-mode power supply unit.

Represented in FIG. 3 is a second switching stage with a transistor T11, which operates with an inverted logic. Connected to the collector of the transistor T11 here, via a resistor R12, is an operating voltage Vcc and also a terminal 6, which is connected to the optocoupler of the switched-mode power supply unit.

In the normal mode of the corresponding device, in which all the output voltages U1–U3 and U5–U8 have their prescribed voltage values, the transistor T11 is switched through by means of the voltage Up which is present at the terminal 4 and, via a voltage divider R10, R11, is present at the base of the transistor T11. Therefore, a low voltage is normally present at the terminal 6, corresponding to a "low" signal level.

If one of the output voltages to be monitored then drops, for example due to overloading or due to a short-circuit, the second operating voltage U0 drops and, as a result, the voltage at the base of the transistor T11 likewise drops. As a result, the transistor T11 is turned off, so that, in the event of a fault, the voltage at the terminal 6 is high, in a way corresponding to the operating voltage Vcc. The second switching stage of FIG. 3 can therefore be used for a switched-mode power supply unit, which uses a control loop with which the switched-mode power supply unit is switched off in the event of a high voltage at the optocoupler.

The switching stages of FIGS. 2 and 3 also have a capacitor C10, by which they have a time constant and are hereby activated with a delay. This is necessary in order that the associated power supply unit reliably runs up after switching on. This ensures that the output voltages to be monitored first reach their nominal value and the protection circuit is only activated when the capacitor C10 is charged up.

Therefore, a large number of output voltages which are either only present in the normal mode or present both in the normal mode and in the standby mode can be monitored by a protection circuit with two active switching stages, for example two transistors. This is important in particular for output voltages that are produced by secondary windings which have a weak coupling with respect to the other windings of a transformer used in the switched-mode power supply unit. The protection circuit is advantageous in particular for switched-mode power supply units controlled on the secondary side, but may also be used for switched-mode power supply units controlled on the primary side if the voltage of the second switching stage that is present at the terminal 5 or terminal 6 according to FIG. 2 or 3 is transferred to the primary side via for example a transformer or an optocoupler. The protection circuit can be used not only together with an isolating transformer, it can also be used for other power supply units that produce a large number of output voltages.

The invention claimed is:

1. A protection circuit with a first switching stage for monitoring output voltages of a power supply unit which has a normal mode and a standby mode,
   said power supply unit being a switched-mode power supply with an isolating transformer and a primary side and a secondary side, and said protection circuit being arranged at said secondary side, wherein
   said first switching stage comprises
   a current input, to which output voltages are coupled for monitoring, which are present both in the normal mode and in the standby mode, and
   a control input, to which output voltages are coupled for monitoring, which are only present in the normal mode and a control signal is coupled, by which the power supply unit is switched over between the normal mode and the standby mode, the control signal blocking the switching stage in the standby mode.

2. The protection circuit as claimed in claim 1, wherein the control signal is coupled to the control input via a diode.

3. The protection circuit as claimed in claim 1, wherein a second switching stage is coupled to the current input of the first switching stage, and wherein the second switching stage switches off the power supply unit if there is a drop in the operating voltage present at the current input.

4. The protection circuit as claimed in claim 3, wherein the second switching stage is connected to a control loop of the power supply unit for switching off the power supply unit via the control loop if there is a drop in the operating voltage.

5. The protection circuit as claimed in claim 3, wherein the second switching stage has a capacitor for a delayed activation of the protection circuit after a switching on of the power supply unit.

6. The protection circuit as claimed in claim 1, wherein the output voltages which are coupled to the current input of the first switching stage and which are present both in the normal mode and in the standby model, are coupled to the current input via a series connection of resistors and are decoupled from one another via at least one diode, and wherein one of the output voltages coupled to the current input produces a first operating voltage for the current input.

7. The protection circuit as claimed in claim 1, wherein the output voltages which are only present in the normal mode are present at the control input of the first switching stage via a series connection of resistors and are decoupled here from one another via at least one diode, and wherein one of these output voltages produces a second operating voltage for the control input.

8. A power supply unit for producing output voltages which are only present in a normal mode, and for producing output voltages which are present both in the normal mode and in a standby mode, comprising a protection circuit as claimed in claim 1.

9. The power supply unit as claimed in claim 8, wherein the power supply unit has a control loop for controlling a secondary output voltage, and in that the protection circuit is coupled to this control loop.

* * * * *